United States Patent
Breitfuss

[15] 3,682,334
[45] Aug. 8, 1972

[54] LOAD LIFTING AND TRANSPORT VEHICLE

[72] Inventor: Thomas K. Breitfuss, Tustin, Calif.

[73] Assignee: Hydro Conduit Corporation, Orange, Calif.

[22] Filed: Nov. 12, 1969

[21] Appl. No.: 875,743

[52] U.S. Cl. .................214/75 G, 214/670, 214/730, 214/750, 214/DIG. 3
[51] Int. Cl. .............................................B60p 1/46
[58] Field of Search ........214/75 R, 75 G, 75 H, 670, 214/730, 750, DIG. 1, DIG. 3

[56] References Cited

UNITED STATES PATENTS

| 3,151,755 | 10/1964 | Quayle | 214/75 G X |
| 2,867,341 | 1/1959 | Tieslau | 214/75 R X |
| 3,187,917 | 6/1965 | Miller | 214/670 X |
| 2,684,164 | 7/1954 | Violette | 214/750 X |

Primary Examiner—Robert G. Sheridan
Attorney—McGrew and Edwards

[57] ABSTRACT

Wheeled vehicle with body including forward and rear upright support members in superposed relation to wheels and associated lift mechanism mounted on at least one of said members. One upright member movable forwardly and rearwardly on body to dispose associated lift mechanism in different working positions including a cradled seating position for the load on the body in superposed relation to the wheels, thereby permitting rapid transport of cradled load in balanced relation on vehicle, and a counterbalancing of vehicle weight to load when raising or lowering load. Also disclosed is a wheeled vehicle having an extendible load cradling structure. This vehicle includes a lift mechanism for lifting a heavy object from a ground support and the load cradling structure is selectively extendible to a position for receiving the lifted heavy object.

5 Claims, 10 Drawing Figures

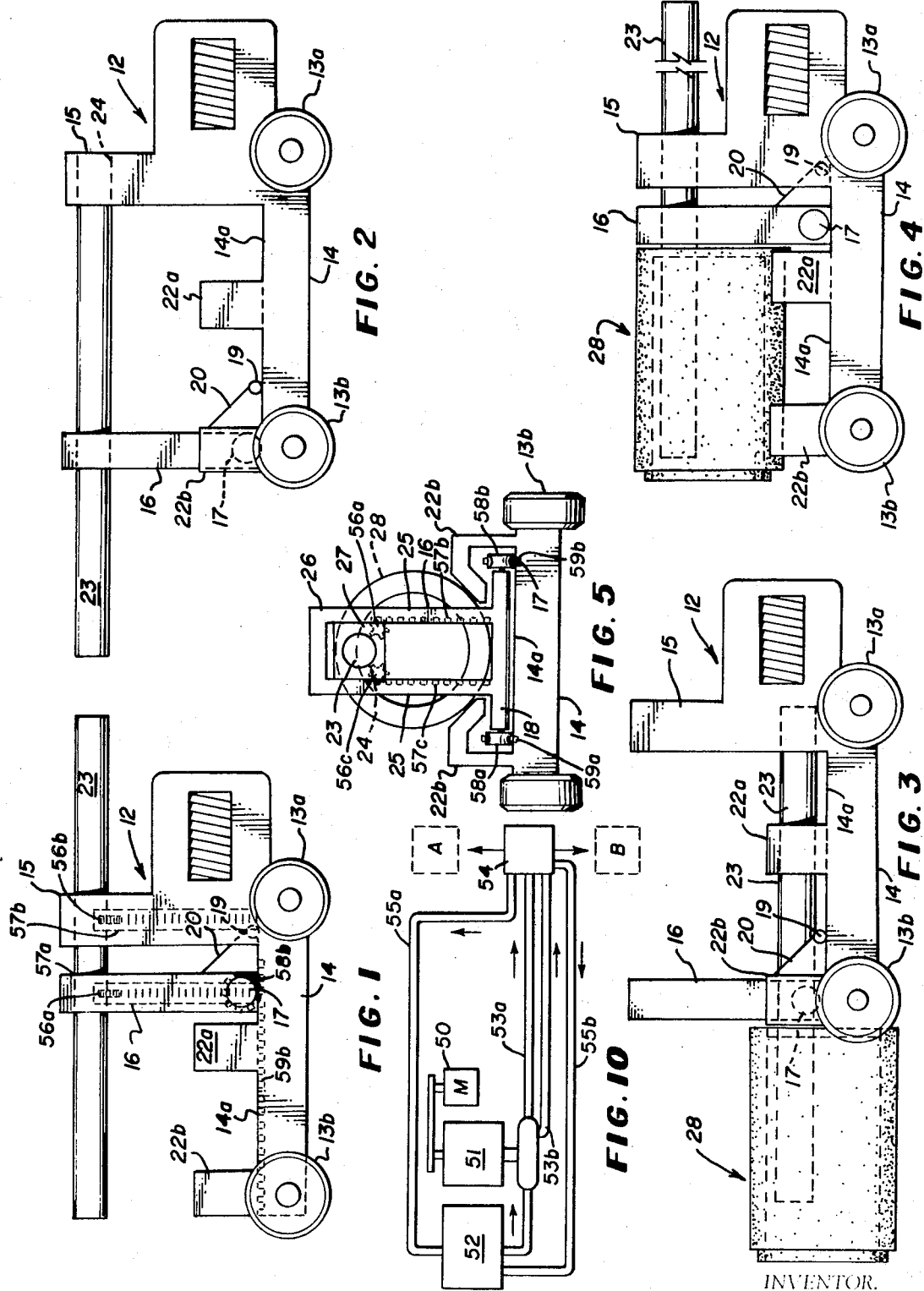

INVENTOR.
Thomas K. Breitfuss
ATTORNEYS

LOAD LIFTING AND TRANSPORT VEHICLE

This invention relates to apparatus for loading and transporting heavy objects, and more particularly to such an apparatus which may be employed to load, transport and selectively deliver a heavy object to a final point of delivery.

At the present time, heavy objects are handled in a production facility by special off-the-highway type lift vehicles which pick up the individual objects and load them on the bed of a large hauling unit, such as a truck, freight car or the like which transports such objects to the site of ultimate use. At the discharge end, substantially the same procedure is employed with the lift vehicles, as aforesaid, operating to lift and unload the objects from the transport vehicle. Once unloaded from the transport vehicle, the heavy objects are lifted again, for example, by a crane, and delivered to the final point of delivery, i.e., the specific place at the use site where the objects are going to be installed or used.

Such multiple handling has the disadvantage of relatively slow movement, first due to the loading and unloading time factor resulting from the slow speed at which the lift type mechanism can be operated and moved to accomplish the loading and unloading functions, and secondly due to the time required to deliver the unloaded objects to their point of final discharge. Also, with respect to the transfer phase, if multiple units are transported on a single vehicle, the rate of travel of such vehicle must be quite slow in order to maintain the heavy load in proper position on the vehicle to prevent tipping, swaying or other driving irregularities.

The present invention represents a number of departures from prior art practices. It provides a vehicle particularly adapted for the combined functions of loading, unloading and delivering bulky heavy objects, such as concrete pipe, a stack of pallets, or other similar objects. Further, the vehicle is particularly suitable for loading, transporting and unloading hollow heavy cylindrical objects. Such a vehicle has a load-carrying capability enabling it to travel under full load condition at relatively rapid speeds and has a specially designed lift mechanism for loading and unloading the heavy objects with the lift of the load substantially counterbalanced by the weight of the vehicle including its wheels. After loading, the load is secured on the vehicle in a balanced load relation so that the vehicle can travel rapidly without tipping, skidding or the like to the place of ultimate discharge of the load.

One innovation employed in one form of the present invention is the provision of a pair of upright support units on the vehicle, one of which is movable and travels from a forward at-rest position to a rearward extended position. "Forward" is used in reference to vehicle travel. The movable upright support unit in its rearward extended position is selectively operable to lift a heavy object, such as a concrete pipe, from ground support to an elevated position exteriorly of the vehicle, and then selectively move the heavy object inwardly over the vehicle bottom for deposit on a cradle structure located on the vehicle. The cradle structure is designed for cradling the heavy object so as to balance the load with respect to the vehicle wheels. Thereby, the heavy object is stably supported on the vehicle so as to permit rapid transport of the vehicle in delivering the cradled object to a final point of delivery.

Another innovation employed in another form of the present invention is the provision of a fixed upright support unit on the vehicle which is selectively operable to lift a heavy object from ground support to an elevated position in conjunction with an extendible load cradling structure on the vehicle which is selectively extendible to a position below the elevated heavy object. With the load cradling structure in its extended position, the heavy object may be deposited on the cradle structure. The cradle structure, as in the other form of the present invention, is designed for cradling the heavy object so as to balance the load with respect to the vehicle wheels, thereby to permit rapid transport of the vehicle.

Accordingly, it is a primary object of this invention to provide simple, durable and economical apparatus which can be used to load a heavy object, such as concrete pipe, at a production site and transport it rapidly to a remote storage point or deliver the heavy object to the place of use.

Another object of the invention is to provide a vehicle having a contained lift assembly which is movable from a forward transport position to a rearward load or unloading position and which utilizes the weight of the vehicle as a counterbalance to the load being lifted so as to provide a simple and efficient lifting system.

A further object of the invention is to provide a novel type of loading mechanism for vehicles which permits a heavy hollow object, such as concrete pipe, to be initially elevated at an end of the vehicle and then moved inwardly over the vehicle body for ultimate deposit on cradle structure disposed on the body in superposed relation to the wheels of the vehicle so as to provide a load placing support which permits rapid transport of the loaded object.

Yet another object of the present invention is to provide a vehicle having a contained lift assembly which is capable of delivering a heavy transported load directly to the ultimate delivery point.

An additional object of the present invention is to provide a novel load transporting vehicle having extendible load cradling structure and a contained lift assembly operable to deposit a load, such as a heavy bulky object, on the cradle structure when it is in its extended position.

Other objects reside in novel details of construction and novel combinations and arrangements of parts, all of which will be described in detail in the course of the following description.

The practice of my invention will be described with reference to the accompanying drawings illustrating typical structural embodiments particularly suited for the purposes of the invention and shown in more or less schematic form. In the drawings, in the several views of which like parts bear similar reference numerals:

FIG. 1 is a side elevation of a vehicle assembly including lift structure and transport features according to the present invention;

FIG. 2 is a side elevation view similar to FIG. 1 and showing the range of movement of one of the support members of the loading assembly;

FIG. 3 is another side elevation view of the unit shown in FIG. 1 with the extended boom member in a pick-up position relative to a heavy object, here represented as a section of concrete pipe;

FIG. 4 is another side elevation similar to FIG. 1 and showing the boom member returned to the FIG. 1 position but supporting the lifted concrete pipe in the position in which it is being loaded into the cradle structure in which it is secured during transport;

FIG. 5 is an end elevation of the assembly shown in FIG. 4 with concealed portions of the movable support indicated by dash lines;

FIG. 10 is a flow diagram of a typical hydraulic circuit used in the practice of my invention.

Figure 6:
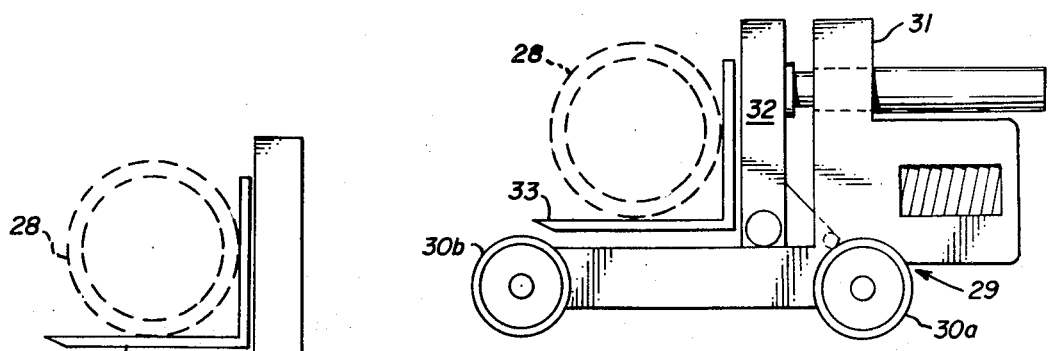
FIG. 6 is another side elevation view of a modified type of apparatus showing the boom member in retracted position and carrying a lift assembly constructed and arranged to function as the cradle structure of the unit with the position of a heavy object, such as concrete pipe, being illustrated in dash lines in the position it assumes during transport.

As shown in FIGS. 1–5, a vehicle 12 having the capability of carrying heavy loads at relatively rapid speeds is shown therein. The vehicle 12 is of the wheel mounted type and includes a pair of front wheels 13a and a pair of rear wheels 13b. The vehicle 12 may be of the self-propelled type or may be for towing. If of the self-propelled type, the vehicle 12 may be provided with a two or four wheel drive. Vehicle 12 has a body 14, including an upper flat bed portion 14a. A stationary upright support 15 and a movable upright support 16 are mounted on bed portion 14a and when the movable support 16 is driven to its rearmost position, the supports 15 and 16 are in superposed relation to wheels 13a and 13b, respectively.

Movable support 16 has a drive such as described hereinafter and including wheels 17 carrying the support 16. A base 18 carrying the axles of the wheels 17 also forms a part of the support structure. A stabilizer element is provided for support 16. The stabilizer element includes wheels 19 and a connector support 20. A suitable drive (not shown) for wheels 17 will be encased within support 18, such as the drive motor of a hydraulic or pneumatic power system of the vehicle 12. The views (FIGS. 1 and 2) provide a comparison of the range of movement of movable support 16 and it will be observed that when it is moved to its rearmost position shown in FIG. 2, the supports 15 and 16 are in superposed relation to the wheels 13a and 13b, respectively. FIG. 10 shows the flow pattern of a hydraulic system of the type referred to above. A motor 50 drives a pump 51, and a reservoir 52 supplies the intake side of pump 51. Output lines 53a or 53b may be operated selectively to conduct the liquid to a component to be moved as shown at 54, and the movement will progress to the selected limit position A or B. Return fluid is delivered through lines 55a and 55b to reservoir 52. The operator has a control means for selecting the associated output and return lines to be put into operation in each movement. Similar circuits are provided throughout the vehicle wherever hydraulic movement is required or employed.

Also shown in FIG. 1, vehicle 12 has front and rear sets of cradle members 22a and 22b secured on the bed portion 14a of the vehicle body. The sets of cradle members 22a and 22b are positioned on the bed portion 14a so that the movable member 16 has sufficient clearance through the cradle members 22a and 22b to move from its retracted FIG. 1 position to its extended FIG. 2 position. It is noted that while the sets of cradle members 22 shown are inwardly curved for cradling a cylindrical load, such as a concrete pipe, depending on the load to be transported, the cradle members 22 could be V-shaped, flat or other forms as would be appropriate.

The support members 15 and 16 each have parallel spaced leg portions 25 which comprise their upright structure and a top interconnecting portion 26 which connects the legs 25 to from an integral support structure. The spacing between the leg portions 25 is sufficient to permit the raising and lowering of sliding block members 27 which by a hydraulic system, are slidably mounted between the leg portions 25 of each of the support members 15 and 16. As shown in FIGS. 1 and 5, the wheels 17 may be formed as hydraulically driven pinions 58a and 58b to mesh with fixed horizontal racks 59a and 59b on body 14 to provide the forward and backward movement of member 16. A guide portion 24 for supporting a boom member 23 is formed in each of the sliding block members 27. The boom 23 is secured in the guide portion 24 associated with the movable support member 16 with the boom 23 extending both rearwardly and forwardly from the member 16. The forward extending portion of the boom 23 is slidably supported in the guide portion 24 associated with the fixed support member 15. Movement of the member 16 to its extended position by a hydraulic system slidably moves the forward extending portion of the boom 23 through the guide 24 associated with the support 15 and causes the rearwardly extending portion of the boom 23 to be extended beyond the rear end of the vehicle 14. Members 15 and 16 are provided with fixed upright racks adjoining the surfaces on which blocks 27 slide, numbered 57b and 57a, respectively, in FIG. 1 and 57c in FIG. 5, the latter being typical of the similar arrangement on support member 15. Hydraulically driven pinions 56a, 56b and 56c provide the raise and lower movements for blocks 27. Thereby, the boom 23 may be selectively positioned for engaging a cylindrical load. The range of the movement of the boom 23 is shown comparatively in FIGS. 2 and 3, the latter showing the boom 23 in a lowered position in which it is penetrating the hollow interior of a cylindrical load represented by a piece of concrete pipe 28 preparatory to lifting same.

FIG. 4 illustrates the pipe 28 being elevated to a seated position on cradles 22a and 22b and FIG. 5 shows the final seated position. When so seated, the pipe 28 is secured by the cradle members 22a and 22b and the weight of the pipe and of the boom 23 is distributed so that essentially all of it is balanced in superposed relation to wheels 13a and 13b. The vehicle thus is able to travel rapidly to the point of discharge of pipe 28 wherein the sequence of operations are essentially in inverse order with FIG. 4 representing the first movement, FIG. 3 the second, FIG. 2 the third and FIG. 1 the fourth. It is also noted that the vehicle 12 may be moved into a trench or tunnel with a section of pipe 28 and is capable of placing the pipe 28 in position for installation.

The assembly of FIGS. 1 through 5 may be used effectively in both on and off highway travel. For example, such a vehicle may be part of manufacturing plant equipment used to load sections of concrete pipe from a curing or storage area to a transport vehicle such as a railway car, truck-trailer unit or to other storage areas. It also may be used to transport concrete pipe or the like from a collection site to a place of use, such as a pipe line and such a vehicle may deliver the sections of pipe directly to the installation area and place the pipe directly in the pipe line.

Figure 7:
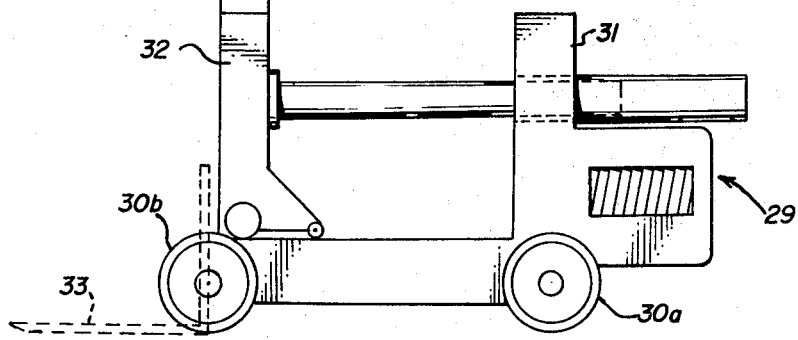
FIG. 7 is a side elevation view similar to FIG. 6 showing the boom member in full line in an extended position with the lift portion shown in dash lines at its bottom pick-up position and shown in full lines at the top in supporting relation to the heavy object shown by dash lines.

FIGS. 6 and 7 show another type of vehicle according to the present invention in which a wheel supported vehicle 29 has front wheels 30a and rear wheels 30b. A stationary support member 31 is located at the forward end of vehicle 29 and a movable support member 32 is mounted for movement from one position adjacent stationary support 31 as shown in FIG. 6 to an extended position adjacent the rear of vehicle 29 where it is in essentially superposed relation to rear wheels 30b. Movable support member 32 is essentially a hydraulic drive fork lift mechanism having a range of elevating movement for its fork portion 33 from the dash line ground position of FIG. 7 to the elevated position shown in full lines in FIG. 7. A section of concrete pipe 28 is shown in dash lines as seated on lift 33 in its elevated position. After the elevated pipe has reached its uppermost position as shown in FIG. 7, movable support member 32 is moved to its forward at-rest position and lift 33 is lowered to place the load between the forward and rearward vehicle wheels. The lift 33 provides the structure for cradling the load 28 so that the vehicle may be moved to rapidly transport the load to the point of delivery.

It is noted that while a cylindrical load is represented in FIGS. 6 and 7, the fork lift 33 is suitable for picking up and cradling other bulky and heavy loads, such as a stack of pallets. Further, the boom member used in the vehicle 29 is shown to be of the telescoping type instead of a unitary piece as shown in FIGS. 1–5, so as to illustrate an equivalent form of boom member. Conventional drive apparatus (not shown) is used for selectively extending and retracting the movable support member 32 and for selectively raising and lowering the fork lift 33.

Figure 8:
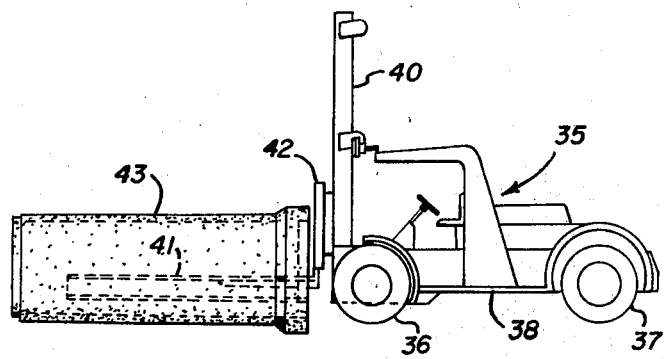
FIG. 8 is another side elevation of a modified type of lift mechanism which is also a transport vehicle and illustrates the lift mechanism in the pick-up position relative to a section of concrete pipe.
Figure 9:
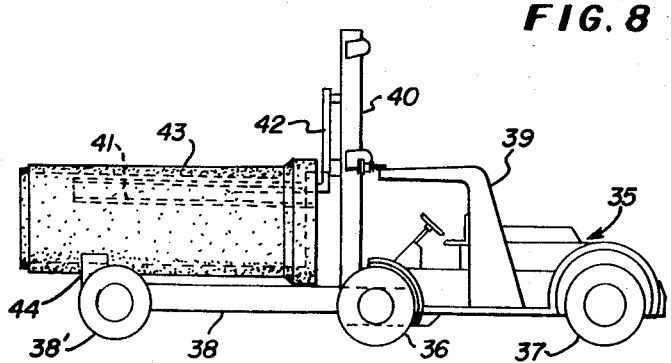
FIG. 9 is another side elevation of the assembly shown in FIG. 8 with its movable cradling structure shown in extended position.

FIGS. 8 and 9 illustrate still another form of the present invention in which a fixed upright support unit is mounted on a vehicle for selectively lifting a heavy load and an extendible load cradling structure is included in the vehicle for receiving the heavy load. Once the load has been deposited in the cradle structure for transport by the vehicle, substantially the entire load is in superposed relation with respect to the front and rear wheels of the vehicle. The vehicle 35 shown in FIGS. 8 and 9, which is preferably of the self-propelled type, includes regular forward steering wheels 36 and rear driving wheels 37. In FIG. 9, forward auxiliary wheels 38' are shown which are selectively movable by operator control hydraulic drive from a position in transverse alinement with wheels 36 to the forward position of FIG. 9. The vehicle 35 preferably has a hydraulic, mechanical or pneumatic power system which provides the means for moving the movable vehicle components, other than the vehicle drive system. Vehicle 35 has a frame or chassis 38 including a rearward stationary support member 39 connected at a forwardly extending end to the mast 40. A lift mechanism 42 which includes a forwardly extending lift seat 41 attached thereto is associated with the mast 40.

As shown in FIG. 8, the vehicle 35 has been moved by an operator (not shown) into a work engaging position wherein the lift seat 41 is inserted into the hollow interior of a cylindrical load which has been represented as a length of concrete pipe 43. The lift mechanism 42 thus is ready to begin the ascending movement required to lift the pipe 43 to an elevated position. Once the pipe 43 has been lifted to an elevated position, the wheels 38' are selectively moved forwardly to their extended position in front of the wheels 36. Thereby, the wheels 38' move a cradle structure 44 which is carried on the extension portion of frame 38, into a load supporting position. The cradle structure 44 has its seat sufficiently elevated so that when the exterior surface of the concrete pipe 43 is seated on the deck of frame 38, the forward end of the pipe 43 will be in slightly elevated relation with respect to its rear end. Thus, the pipe 43, which is also secured by the lifting seat portion 41 to the cradle structure 44, is stably positioned on the vehicle 35. After the load is in place as illustrated in FIG. 9, the vehicle 35 may be driven at high speed for rapidly delivering the pipe 43 to its point of discharge. There, the sequence of steps is repeated in reverse order with the pipe 43 first elevated from the cradle 44, the extension portion of the frame 38 including wheels 38' being retracted, after which the lift mechanism 42 lowers the pipe 43 to the position shown in FIG. 8. At that time the vehicle 35 is moved in reverse to separate the pipe 43 from the vehicle 35.

It is noted that in the vehicle 35, the lift mechanism 42 and its lift seat 41 could take the from of a fork lift, boom or other appropriate lift member. Also, the cradle structure 44 which is shown as curved for receiving a cylindrical load could be V-shaped, flat or another form as appropriate for the shape of load to be lifted and transported.

Thus, there has been provided several embodiments of novel apparatus for loading and transporting heavy bulky objects. The novel apparatus further is operable to deliver the heavy objects directly to their final delivery point without rehandling.

I claim:

1. Load lifting and transporting apparatus, comprising:

a vehicle having a frame;

first and second support members mounted on said frame in superposed relation thereto, said first support member being mounted on said frame for independent movement to different work positions toward and away from said second support member;

a boom supported by each of said support members and mounted for conjoint movement with said first support member from one operating position where it is located almost entirely within the vertical plane of the vehicle to a second operating position where a portion of the boom extends beyond the vertical plane of the vehicle whereby whenever an object is lifted by the boom said first and second support members jointly support said object over said frame, and hold said object when elevated above the frame within the vertical plane of said vehicle during transport movement of the vehicle; and selectively operable lift means mounted on said first and second support members, for directing raise and lower movements to said boom said lift means being selectively operable to lift an object within a range from a rest position on the surface over which said vehicle travels to an elevated position higher than said frame, and said lift means being reversible so as to lower said object from said elevated position to an at rest position on the frame whereby selectively operating said lift means and moving said first support member toward and away from said second support member said object may be loaded on said frame or unloaded therefrom.

2. Apparatus as defined in claim 1, in which said boom is slidable on a supporting surface of said second support member when it is moving conjointly with said first support member.

3. The invention recited in claim 1, including cradle means mounted on said frame for securing and supporting said object when loaded thereon.

4. The invention recited in claim 3, wherein said cradle means includes spaced object supporting surfaces between which said first support member travels in its movement toward and away from the second support member.

5. The invention recited in claim 1, wherein the movement of said first support means and said lift means is controlled by a hydraulic system on the vehicle.

* * * * *